Sept. 5, 1961 G. LYNCH 2,999,129
TELECOMMUNICATION MULTIPLEXING SYSTEM
Filed July 23, 1957
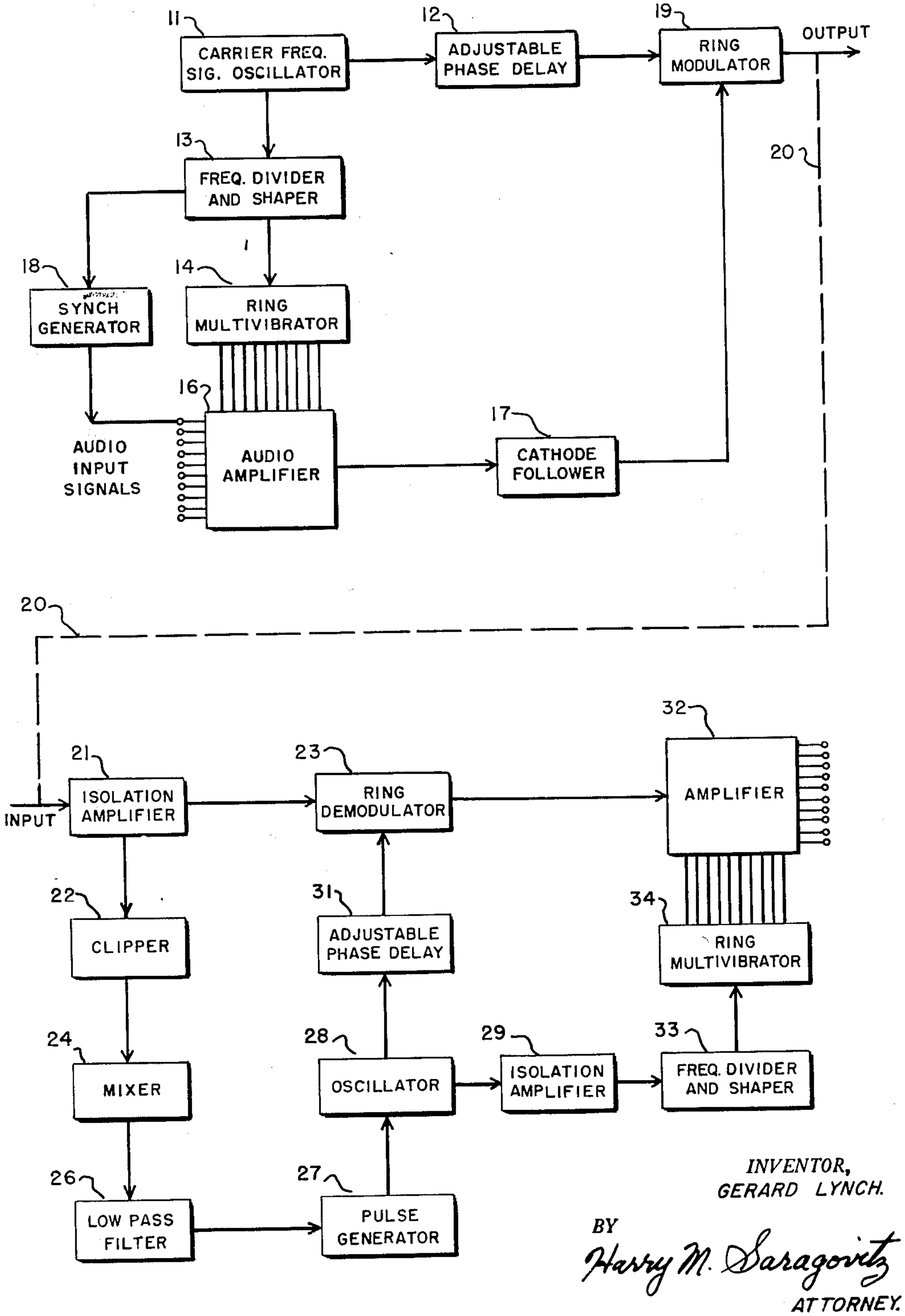
INVENTOR,
GERARD LYNCH.
BY Harry M. Saragovitz
ATTORNEY.

2,999,129

TELECOMMUNICATION MULTIPLEXING SYSTEM

Gerard Lynch, 608 N. Illinois St., Arlington, Va.

Filed July 23, 1957, Ser. No. 673,744
9 Claims. (Cl. 179—15)
(Granted under Title 35, U.S. Code (1952), sec. 266)

The invention described herein may be manufactured and used by or for the Government for governmental purposes without the payment of any royalties thereon.

The present invention relates to a telecommunication multiplexing system and more particularly to a telecommunication multiplexing system wherein successive carrier cycles are individually modulated by separate intelligence signals.

Multiplexing voice (audio) frequency channels for transmission over a single radio (carrier) frequency signal or cable system is a well established art and is presently being carried out by either a frequency division multiplexing carrier system or a pulse time multiplexing system.

Frequency division multiplexing consists of amplitude modulating a carrier frequency signal with intelligence (audio signal) and suppressing the carrier and lower sideband. A different carrier frequency signal is chosen for each intelligence signal to be transmitted and each carrier frequency signal is of ascending order. Each upper sideband that is transmitted occupies an adjacent higher frequency band (generally 3 kc. in width) and is "stacked" in frequency. These "stacked" frequencies are transmitted as a block of frequencies over telephone lines. This system has a disadvantage of needing costly filters and extremely stable oscillator circuits. Thus its use is hampered because of high cost and stringent design requirements imposed on the transmission medium, i.e., the radio relay or cable system.

Pulse time multiplexing is a system wherein pulses present in a pulse train are modulated either in amplitude, width, or position by the intelligence. For each unit of time, there is a group of pulses, the number of pulses of the group being equal to the number of intelligence signals to be transmitted. Thus each successive pulse of a pulse group carries in the form of pulse modulation the intelligence of a separate input signal. The repetition of these pulse groups in the same order allows for the transmission of a plurality of intelligence signals. The limitation to the system is the necessity for an extremely wide bandwidth.

An object of the present invention is to provide an improved multiplexing system in which a plurality of audio signals may be transmitted and received on a single carrier wave.

Another object of the present invention is the provision of improved means for detecting the plurality of audio signals.

A further object of the present invention is the provision of an improved system adapted to the transmission, reception, and detection of more than two messages simultaneously.

In accordance with the invention herein, a plurality of intelligence signals are formed into a single complex signal by sequentially sampling each of the plurality of signals for a period equal to one period of a carrier frequency signal and modulating the carrier frequency signal during the sampling process by the respective signal being sampled. The modulation is carried out in a ring modulator wherein a suppressed carrier modulated wave is produced.

The exact nature of this invention, as well as other objects and advantages thereof, will be readily apparent from consideration of the following specification relating to the annexed drawing, in which the single figure is a block diagram of a preferred embodiment of the invention.

It should be understood that the telecommunication multiplexing system as described herein is applicable to other than audio signals. It is applicable to any type of intelligence signal.

The terms synchronizing and synchonous are abbreviated herein as "synch."

Referring now to the drawing, there is shown an oscillator 11 supplying carrier frequency oscillations to adjustable phase delay network 12 and to frequency divider and shaper circuit 13. The carrier frequency signal, a sine waveform, must be at a value of at least twice the highest audio frequency to be transmitted (sampling rate) times the number of signal (voice) channels desired to be transmitted. It should be understood that if other than audio signals were to be transmitted, this sampling rate, being a function of the individual signal bandwidths, would be twice the highest frequency to be transmitted. Frequency divider and shaper circuit 13 initiates an output voltage in pulse form of a repetition rate equal to the carrier frequency divided by the number of signal channels being transmitted, direction being positive in nature, and duration being approximately equal to one cycle of the carrier frequency. This output voltage (pulse train) is injected into ring multivibrator 14, which is a group of cascaded monostable multivibrators equal in number to the total number of voice channels to be transmitted and which acts as a multi-gate switching device.

The outputs from ring multivibrator 14 are applied sequentially to a group of audio amplifiers 16, normally biased below cut-off and equal in number to the number of voice channels that are desired to be transmitted. Each voice channel is connected, respectively, to one audio amplifier of the group of audio amplifiers 16. Thus, as the first multivibrator of ring multivibrator 14 changes state from stable to unstable state, a bias is applied to the first of the group of audio amplifiers 16, the intelligence signal applied thereto is sampled, and an amplified signal output is derived therefrom which is of duration of one cycle of the carrier wave. This amplified signal output is then applied to cathode follower 17 which provides the necessary constant impedance to the intelligence signal and acts as a buffer stage. The output from the first multivibrator is simultaneously applied to the second multivibrator of ring multivibrator 14, causing it to change its state from stable to unstable state. This allows a bias to be applied to the second of the group of audio amplifiers 16, allowing the intelligence signal applied thereto to be sampled. Simultaneous with the start of conduction of the second audio amplifier, the first audio amplifier will be cut off since the first multivibrator will have returned to its stable condition. The output signal from this second audio amplifier and the output signals from each of the other audio amplifiers will each be of duration equal to one cycle of the carrier frequency signal and will also be applied to cathode follower 17, the output signal from this second audio amplifier occurring right after the output of the first audio amplifier and so on with each of the output signals from the other audio amplifiers. Substantially no time elapses between the end of the first output signal and the beginning of the second output signal. This sequential operation of the multivibrators of the ring multivibrator 14 and the group of audio amplifiers 16 continues until the number of audio signals being sequentially applied to cathode follower 17 are equal to the number of voice channels. Since the pulses of the pulse train injected into ring multivibrator 14 have a pulse repetition rate equal to the carrier frequency divided by the number of signal channels being transmitted, the information applied to cathode follower 17 will be a complex waveform made up of the sequentially sampled outputs from the group of audio amplifiers 16 being repeated at a repetition rate equal to the pulses of the pulse train.

A synch generator 18, a standard, free running, frequency divider, of the flip-flop variety is electrically connected between the output of frequency divider and shaper circuit 13 and the input of the first audio amplifier of the group of audio amplifiers 16. Synch generator 18 divides the output from frequency divider and shape circuit 13 by two and by means of a standard filter network, produces a sine wave or square wave of constant frequency equal to the carrier frequency of oscillator 11 divided by two times the number of intelligence signal channels. This output is then applied to the input of the first audio amplifier of the group of audio amplifiers 16. This signal, which will be used at the receiver to provide channel synchronization, is amplified by the first audio amplifier and applied to cathode follower 17. Thus the first audio amplifier is actually a synch amplifier since it is used to only pass the synch signal. In speaking of audio channels, it should be understood that the synch channel is considered as an audio channel. Therefore, in determining the carrier frequency to be used, the sampling rate should be multiplied by the audio channel, i.e., by the actual number of different audio signals plus the synch signal. Because of its use in the receiver the synch signal should have an amplitude of greater value than the signals in the other channels.

Cathode follower 17 has its output (synch signal and audio signals) electrically connected to the audio input of suppressing carrier balanced ring modulator 19, such as described in pages 552 and 553, Radio Engineers' Handbook, first edition, 1943, by Terman. This synch signal and audio signals are the source of modulating voltage.

The output from adjustable phase delay network 12 is electrically connected to the carrier frequency input of ring modulator 19 and supplies the source of carrier voltage. Thus for a given period of time equal to one carrier cycle, a portion of one audio input channel having a duration equal to a period of one carrier cycle is connected to the audio input of modulator 19 and modulates one cycle of the carrier signal. The next carrier cycle is then modulated by the next audio input channel. This operation continues for the duration of one carrier cycle times the number of audio signals to be transmitted, and then is repeated. Therefore, the output voltage from ring modulator 19 is the carrier voltage being modulated by the synch signal and the different audio signals, said output voltage being a complex suppressed carrier signal. Adjustable phase delay network 12 is mechanically adjusted so that the carrier frequency waveform is in proper phase with the audio signals. Conventional phase sensitive servo means can be provided for automatic adjustment of phase delay network 12.

If, for example, it is desired to transmit 9 different audio signals, the output from ring modulator 19 will be a carrier signal having its first cycle modulated by a portion of the synch signal, the second cycle modulated by a portion of the first audio channel, the third cycle modulated by a portion of the second audio channel, and so on until the tenth cycle is modulated by a portion of the ninth audio cycle. The next cycle, or eleventh, is modulated by another portion of the synch signal. Thus, after every 10 cycles of carrier signal, the above is repeated. Every period of time equal to 10 cycles of carrier signal will contain information from the synch signal and nine distinct audio channels.

The modulated carrier output of ring modulator 19 may be filtered and amplified, and then transmitted over the usual carrier channel, which may be a cable, or may comprise an antenna which radiates the wave to a remote point where it is picked up and translated by a receiver.

The transmission channel connecting the transmitter and receiver is indicated by the broken line 20.

The portion of the system used to receive, detect, and separate the various intelligence signals comprises isolation amplifier 21 for receiving the complex suppressed carrier signal from the transmitter section and for compensating for gain or loss in the transmission medium. Its output is electrically connected to clipper stage 22 and to the wideband input of ring type demodulator 23. Clipper stage 22, which is a standard clipper circuit, is adjusted to pass only that portion of the suppressed carrier signal containing the synch signal information, since the synch signal is of larger amplitude than any of the audio signals. Thus by adjusting clipper stage 22, as mentioned, only the portion of the suppressed carrier signal containing the synch information, which is at a constant amplitude, and at a fixed tuned frequency, due to its frequency in the receiver and the sampling rate used therein, is injected into mixer stage 24. Mixer stage 24 is a square law device which beats the two sidebands of the clipped synch signal producing harmonics of the two sidebands and two new sidebands signals, the lower new sidebands signal being at a frequency equal to the carrier frequency of the transmitter divided by the number of channels (sampling rate) and the upper new sideband signal being at a much higher frequency than either of the two original sidebands.

The output from mixer 24 is next applied to low-pass filter 26 which passes only the lower new sideband signal. Filter 26 is electrically connected to pulse generator 27 and applies thereto as triggering information this lower new sideband signal. The output pulses from pulse generator 27, which is at a pulse repetition rate equal to the carrier frequency divided by the number of transmitted channels, is applied to free-running oscillator 28 which is tuned to approximately the carrier frequency of the transmitter. Thus the output pulses from pulse generator 27 are used to frequency and phase lock oscillator 28 to the carrier frequency of the transmitter, i.e., to a frequency of the number of channels times the pulse repetition rate of the pulses of pulse generator 27. The detail of this pulsed frequency controlled oscillator, free running oscillator 28, are discussed in an article by Alwin Hahnel, entitled "Multichannel Crystal Control of VHF and UHF Oscillators," in the January 1953 issue of Proceedings of the I.R.E.

The output from oscillator 28, which is a signal of the carrier frequency of the transmitter, is electrically connected to both isolation amplifier 29 and adjustable phase delay means 31. Delay means 31 has its output, in turn, electrically connected to the carrier input side of ring type demodulator 23 where it serves as the carrier demodulator voltage. Adjustable phase delay 31 is used so that the phase of the carrier signal supplied from oscillator 28 and the phase of the modulated signal as supplied by isolation amplifier 21 will be adjusted properly so that the signal supplied from isolation amplifier 21 will be demodulated correctly.

The output from ring type demodulator 23, which is a complex intelligence signal similar to that fed to the input of ring modulator 19 from cathode follower 17 of the transmitter, is applied to amplifier 32, which is a multichannel amplifier having the same number of channel stages as there are intelligence signals transmitted and received.

Isolation amplifier 29, serving as a buffer stage and level and frequency control, has its output electrically connected to frequency divider and shaper circuit 33 wherein the carrier signal is divided in frequency by the number of channels that were transmitted and wherefrom pulses are derived having a duration of time equal to one carrier cycle and a repetition rate equal to the carrier frequency divided by the number of channels (the sampling rate). These pulses are applied to ring multivibrator 34, having multivibrator stages equal to the number of intelligence signals that are transmitted, and trigger the ring multivibrator 34 into operation. The output from each of the stages of ring multivibrator 34 is connected to amplifier 32 such that the output from the first stage of ring multivibrator 34 will control the operation of the first channel stage of amplifier 32, the output from the second stage of ring multivibrator 34 will control the operation of the second channel stage of amplifier 32, and so on until the output from the final stage of ring multivibrator 34 will control the operation of the final channel stage of amplifier 32. The output from each of the stages of ring multivibrator 34 will be of duration equal to one carrier cycle and will have a pulse repetition rate of the carrier frequency divided by the number of channels that were transmitted. Thus, ring multivibrator 34 behaves as a gating device to amplifier 32, opening and closing each channel stage thereof in synchronism with the demodulated, pulsed, complex signals. The output from each channel stage of amplifier 32 will be a different intelligence signal, each corresponding to one of the intelligence signals that were transmitted.

The foregoing disclosure relates to a preferred embodiment of the invention. Numerous modifications or alterations may be made therein without departing from the spirit and the scope of the invention as set forth in the appended claims.

What is claimed is:

1. A telecommunication multiplexing system comprising a transmitter having generating means for producing a carrier signal, means connected to said generating means for sequentially sampling each of a plurality of audio-signal channels at a repetition rate equal to the carrier frequency divided by the number of audio signal channels being transmitted for a duration of time equal to one cycle of said carrier frequency signal, means connected to said last named means for forming a complex audio waveform, and means connected to said generating means for suppressed-carrier modulating said carrier frequency with said complex audio waveform and having as an output a complex suppressed carrier signal; and a receiver having means for producing a signal at approximately said carrier frequency, means for frequency and phase locking said last named means to said carrier frequency, detecting means for receiving said produced carrier frequency signal and said complex suppressed carrier signal and having as an output a complex audio signal waveform; and a sampling means for sequentially sampling said complex audio signal waveform at a repetition rate equal to the carrier frequency divided by the number of audio signal channels being transmitted for a duration of time equal to one cycle of said carrier frequency signal, and means connected to said sampling means for forming a plurality of audio signal outputs equal to the number of said audio signal channels being transmitted.

2. A telecommunication multiplexing system for transmitting and receiving a plurality of audio signals comprising a transmitter having an oscillator for generating a carrier frequency signal, a frequency divider and shaper circuit for dividing said carrier frequency and having as an output pulses of duration of one cycle of said carrier frequency signal and of repetition rate equal to said carrier frequency signal divided by the number of audio signals being transmitted, a ring multivibrator triggered by said pulses and having a plurality of stages and outputs equal to the number of signals being transmitted, a group of normally blocked audio amplifiers equal in number to the number of signals being transmitted and sequentially biased to conduction by signals sequentially applied thereto from said plurality of stages of said ring multivibrator allowing each of said amplifiers to conduct sequentially and sample each said audio signal channels for a period of time equal the duration of one cycle of said carrier frequency signal, and a ring modulator having applied thereto said carrier frequency signal and a complex audio signal output from said group of audio amplifiers and having as an output a complex suppressed carrier modulated wave of said complex audio signal; and a receiver having means for producing a signal at said carrier frequency, a ring type demodulator for receiving said complex suppressed carrier signal and said produced carrier frequency signal and having as an output a complex audio signal waveform, means for producing a train of pulses from said produced carrier frequency signal wherein the pulses thereof have a repetition rate equal to said carrier frequency divided by the number of audio signal channels being received and a duration equal to one cycle of said carrier frequency signal, a ring multivibrator having said train of pulses applied thereto, and a multichannel amplifier having said complex audio signal waveform applied thereto and having the amplifier channels thereof sequentially switched by the outputs from said ring multivibrator to allow said amplifier channels to each pass one audio signal channel therethrough.

3. A telecommunication multiplexing system for transmitting and receiving a plurality of audio signal channels comprising a first oscillator for generating a carrier frequency signal; a first frequency divider and shaper circuit electrically connected to said first oscillator for dividing said carrier frequency signal and having as an output pulses of duration of one cycle of said carrier frequency signal and of repetition rate equal to said carrier frequency divided by the number of audio channels being transmitted; a first ring multivibrator and a synchronous generator to receive said pulses, said synchronous generator having as an output a sine wave synchronizing signal of amplitude greater than said audio signals and a frequency of half the repetition rate of the output from said first frequency divider and shaper circuit, said first ring multivibrator having a plurality of stages and outputs equal to the number of channels being transmitted; a group of audio amplifiers equal in number to the number of channels being transmitted, each of said outputs of said first ring multivibrator being electrically connected, respectively, to an amplifier of said group of audio amplifiers, said output from said synchronous generator being applied to the first amplifier of said group of audio amplifiers and said audio channels being electrically connected, respectively, to each of the other amplifiers of said group of audio amplifiers, said outputs from said first ring multivibrator sequentially biasing each of said amplifiers into conduction for a period of time equal to the duration of one cycle of said carrier frequency signal to allow said audio channels to be sampled sequentially; a cathode follower having applied thereto said sequentially sampled audio signals in a complex waveform; a ring modulator; a first adjustable phase delay electrically connected between said oscillator and said ring modulator to adjust the phase of said carrier frequency signal to said ring modulator, said complex waveform being applied to said ring modulator and modulating said carrier frequency signal, said ring modulator having as an output a complex suppressed carrier modulated wave of said complex waveform; means for transmitting said complex suppressed carrier modulated wave; means for receiving the latter wave comprising a first isolation amplifier for amplifying said carrier complex suppressed carrier modulator wave, a ring type demodulator and a clipper electrically connected to said first isolation amplifier; said clipper allowing only said synchronizing signal to be passed thereby; a mixer to receive said synchronizing signal and mix the upper and lower sidebands thereof forming a sum and difference frequency signal; a low pass filter to pass said difference frequency signal; a pulse generator triggered by said difference frequency signal and having an output with repetition rate equal to said carrier frequency divided by said number of audio channels being received; a second oscillator frequency and phase locked to said carrier frequency signal by said output from said pulse generator; a second adjustable phase delay for feeding the output from said second oscillator in the proper phase to said ring type demodulator, said ring type demodulator having a complex audio signal output; a second isolation amplifier having applied thereto said output from said second oscillator; a second frequency divider and shaper circuit wherein the carrier frequency is divided in frequency by said number of audio channels being received and wherefrom pulses are derived each having a duration equal to one that of one carrier cycle; a second ring multivibrator having applied thereto said pulses from said second frequency divider and shaper circuit and being triggered thereby, said second ring multivibrator having a plurality of stages and outputs equal to said number of audio channels being received; and a multichannel amplifier having the same number of channel stages as number audio channels being received, said complex audio signal output from said ring type demodulator being applied to said multichannel amplifier, said second ring multivibrator having stages connected, respectively, to each of said channel stages of said multichannel amplifier allowing each of said channel stages to sequentially sample said complex audio signal, each of said channel stages having an output being a reproduction of one of said audio channels.

4. A transmitter for a telecommunication multiplexing system for transmitting a plurality of audio signal channels comprising a first means for generating a carrier frequency signal; a second means connected to said first means for sequentially sampling each of said plurality of audio channels for a period of time equal to the duration of one cycle of said carrier frequency signal and at a repetition rate of the carrier frequency divided by the number of said plurality of audio channels being transmitted; a third means connected to said second means for forming a complex waveform; a fourth means connected to said first means for adjusting the phase of said carrier frequency signal to that of said complex waveform; and a fifth means connected to said third and fourth means for modulating said carrier frequency by said complex audio waveform and having as an output thereof a complex suppressed carrier signal.

5. A transmitter for a telecommunication multiplexing system for transmitting a plurality of audio signal channels comprising an oscillator for generating a sine wave carrier frequency signal; a frequency divider and shaper circuit electrically connected to said oscillator for dividing said carrier frequency signal and having as an output pulses of duration of one cycle of said carrier frequency signal and of repetition rate equal to said carrier frequency signal divided by the number of audio channels being transmitted; a ring multivibrator to receive said pulses and having a plurality of stages equal to the number of channels being transmitted; a group of audio amplifiers having amplifiers equal in number to the number of channels being transmitted, each of said stages being connected, respectively, to an amplifier of said group of audio amplifiers, said audio channels each being connected to one amplifier of said group of audio amplifiers, said group of audio amplifiers having a complex audio signal output; a ring modulator having applied thereto said sine wave carrier frequency signal and said complex waveform, said ring modulator having as an output a suppressed carrier modulated wave of said complex audio signal.

6. A transmitter for a telecommunication multiplexing system for transmitting a plurality of audio signal channels comprising an oscillator for generating a carrier frequency signal; a frequency divider and shaper circuit electrically connected to said oscillator for dividing said carrier frequency signal and having as an output pulses of duration of one cycle of said carrier frequency signal and of repetition rate equal to said carrier frequency divided by the number of audio channels being transmitted; a ring multivibrator and a synchronous generator to receive said pulses, said synchronous generator having as an output a sine wave of amplitude greater than said audio signals and frequency of half the repetition rate of the output from said frequency divider and shaper circuit, said ring multivibrator having a plurality of stages and outputs therefrom equal to the number of channels being transmitted; a group of audio amplifiers having amplifiers equal in number to the number of channels being transmitted, said ring multivibrator having each of said outputs electrically connected, respectively, to an amplifier of said group of audio amplifiers, said output from said synchronous generator being applied to the first amplifier of said group of audio amplifiers and said audio channels being electrically connected, respectively, to each of the other amplifiers of said group of audio amplifiers said outputs from said ring multivibrator sequentially biasing each of said amplifiers into conduction for a period of time equal to the duration of one cycle of said carrier frequency signal to allow said audio signal channels to be sampled sequentially; a cathode follower for receiving said sequentially sampled audio signals in a complex waveform; a ring modulator; and an adjustable phase delay, said adjustable phase delay being electrically connected between said oscillator and said ring modulator to adjust the phase of said carrier frequency signal and to apply said carrier frequency signal to said ring modulator, said complexed waveform being applied to said ring modulator and modulating said carrier frequency signal, said ring modulator having as an output a suppressed carrier modulated wave of said complex waveform.

7. A receiver for telecommunication multiplexing system for receiving and detecting a plurality of audio signal channels from a complex suppressed carrier signal comprising generating means for producing a signal at the carrier frequency; means for frequency and phase locking the produced signal to said carrier frequency, detecting means for receiving said produced carrier frequency signal and said complex suppressed carrier signal and having as an output a complex audio signal waveform; pulse forming means connected to said generating means for developing a train of pulses having a repetition rate equal to the carrier frequency divided by the number of audio signal channels being received and sampling means connected to said pulse forming means and to said detecting means for sequentially sampling said complex audio signal waveform to form a plurality of outputs equal to the number of said audio signal channels being received.

8. A receiver for a telecommunication multiplexing system for receiving and detecting a plurality of audio signal channels from a complex suppressed carrier signal comprising means for producing a signal at the carrier frequency; a ring type demodulator for receiving said complex suppressed carrier signal and said produced carrier frequency signal; said ring type demodulator having as an output a complex audio signal waveform; means for producing a train of pulses from said produced carrier frequency signal having a repetition rate equal to said produced carrier frequency divided by the number of audio signal channels being received and a duration equal to one cycle of said carrier frequency signal; a ring multivibrator and a multi-channel amplifier, said complex audio signal waveform being applied to said multichannel amplifier, said train of pulses being applied to said ring multivibrator, said ring multivibrator acting as a multichannel switch to said multichannel amplifier allowing each amplifier stage of said multichannel amplifier to pass one audio signal channel therethrough.

9. A receiver for a telecommunication multiplexing system for receiving and detecting a plurality of audio signal channels and a synchronizing signal from a complex suppressed carrier signal comprising a first isolation amplifier for receiving and amplifying said complex suppressed carrier signal; a ring type demodulator and a clipper electrically connected to said first isolation amplifier, said clipper allowing only said synchronizing signal to be passed thereby; a mixer to receive said synchronizing signal and mix the upper and lower sidebands thereof forming a sum and difference frequency signal; a low pass filter to pass said difference frequency signal; a pulse generator being triggered by said difference frequency signal and having an output with repetition rate equal to the carrier frequency divided by said number of audio channels being received; an oscillator being frequency and phase locked to said carrier frequency signal by said output from said pulse generator; an adjustable phase delay for feeding the output from said oscillator in the proper phase of said ring type demodulator, said ring type demodulator having as an output a complex audio signal; a second isolation amplifier having applied thereto said output from said oscillator; a frequency divider and shaper circuit wherein the carrier frequency is divided in frequency by the number of audio channels being received and wherefrom pulses are derived having a duration of time equal to one carrier cycle; a ring multivibrator to receive said pulse and to be triggered thereby, said ring multivibrator having a plurality of stages and outputs equal to said number of audio channels being received; and a multichannel amplifier having the same number of channel stages as number audio channels being received, said complex audio signal output from said ring type demodulator being applied to said multichannel amplifier, said ring multivibrator having stages connected respectively to each of said channel stages of said multichannel amplifier allowing each of said channel stages to sequentially sample said complex audio signal, each of said channel steps having an output being a reproduction of one of said audio channels.

References Cited in the file of this patent

UNITED STATES PATENTS

| | | |
|---|---|---|
| 2,262,764 | Hull | Nov. 18, 1941 |
| 2,543,738 | Houghton | Feb. 27, 1951 |
| 2,662,116 | Potier | Dec. 8, 1953 |
| 2,664,462 | Bedford et al. | Dec. 29, 1953 |
| 2,700,068 | Muller | Jan. 18, 1955 |
| 2,852,610 | Levine | Sept. 16, 1958 |
| 2,878,316 | Boothroyd | Mar. 17, 1959 |